No. 739,107. PATENTED SEPT. 15, 1903.
D. T. PITKETHLY & J. C. HAYES.
APPARATUS FOR STOPPING LEAKS IN PIPES AND FITTINGS.
APPLICATION FILED JUNE 4, 1902.
NO MODEL.

WITNESSES
INVENTORS
David T. Pitkethly
Jerome C. Hayes
BY E. M. Marble
ATTORNEY

No. 739,107. Patented September 15, 1903.

UNITED STATES PATENT OFFICE.

DAVID T. PITKETHLY AND JEROME C. HAYES, OF NEW YORK, N. Y., ASSIGNORS OF ONE-FOURTH TO JOHN E. STARR, OF NEW YORK, N. Y.

APPARATUS FOR STOPPING LEAKS IN PIPES AND FITTINGS.

SPECIFICATION forming part of Letters Patent No. 739,107, dated September 15, 1903.

Application filed June 4, 1902. Serial No. 110,147. (No model.)

*To all whom it may concern:*

Be it known that we, DAVID T. PITKETHLY and JEROME C. HAYES, residing at New York, State of New York, have invented certain new and useful Improvements in Apparatus for Stopping Leaks in Pipes and Fittings, of which the following is a specification.

Our invention relates to an apparatus or device for use in stopping leaks in pipes and fittings, which will be more fully hereinafter described, and pointed out in the claims.

The object of our invention is to produce an apparatus which can be successfully used in stopping a leak in pipes or fittings of any size, whether using steam, water, gas, or ammonia.

Heretofore devices and apparatus have been devised for stopping leaks in medium or small sized pipes, and such devices have proved unserviceable in large pipes, and the result has been that new pipes have been required to be purchased at very large expense in order to carry on the business in which such pipes and fittings were used.

Our apparatus is shown in the accompanying drawings, forming a part of this application.

Figure 1:
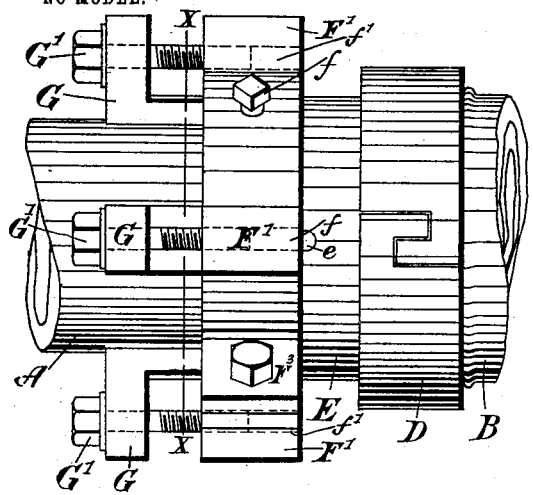
Figure 2:
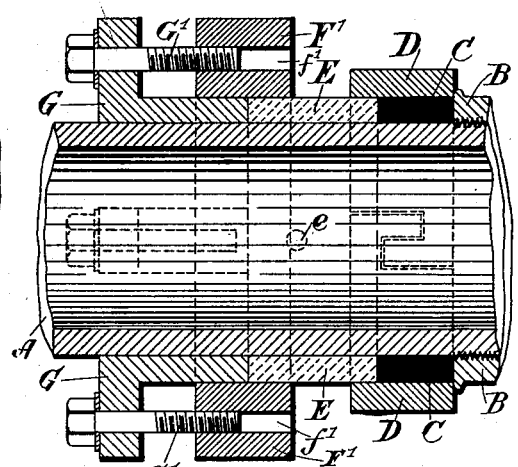
Figure 3:
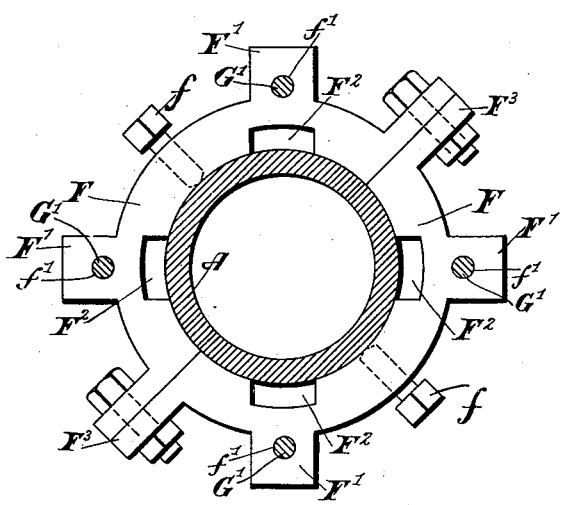
Figure 4:
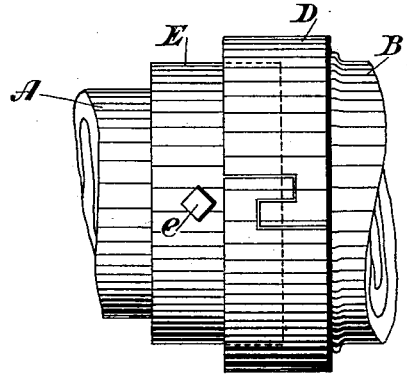
Figure 5:
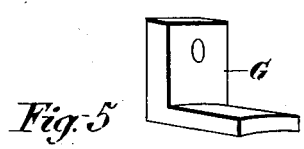
Figure 6:
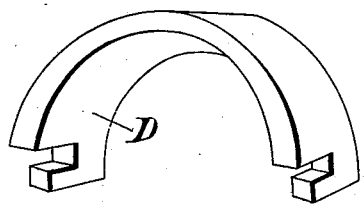

Figure 1 is a side plan view of a pipe with our apparatus arranged thereon for use. Fig. 2 is a longitudinal section of a pipe with our apparatus shown thereon. Fig. 3 is a cross-section of the apparatus as shown at line X X, Fig. 1. Fig. 4 is a plan view showing a pipe with our apparatus attached, the compressing devices being removed. Fig. 5 is a perspective view of the plunger as shown in Figs. 1 and 2. Fig. 6 is a perspective view of the interlocking confining-ring as shown in Figs. 1 and 2.

In the drawings, A represents the pipe; B, the fitting to which our apparatus is applied and at the junction of which with a pipe the leak to be remedied occurs.

C is a packing-ring.

D is a confining-ring, to be placed partly over the packing-ring and partly over the gland E to hold said gland and packing-ring in place when this apparatus is used.

E is a gland-ring.

It will be understood that this apparatus can be used with any-sized pipe and fitting, provided that the sizes of such pipes and fittings are made known, so that the apparatus can be adapted thereto.

F is a ring made of two parts united together by lugs and bolts $F^3$ and is provided with projecting lugs $F'$, having tapped openings to receive bolts $G'$, and also slots $F^2$, in which plungers G work.

G G G G are plungers provided with openings, through which bolts $G'$ $G'$ $G'$ $G'$ work, and with projecting bases passing through slots $F^2$ in ring F against gland-ring E.

The operation of the device is as follows: The entire device is placed on pipe A and against the face of fitting B, between which the leak occurs, in the position shown in Figs. 1 and 2. The packing-ring C is first placed over or around pipe A and pressed snugly against the face of fitting B. Confining-ring D being of greater width than ring C is placed over C and against the face of the fitting B. Gland-ring E is next placed in position shown, partly under ring D and against packing C. Ring F is next placed on pipe A in the position shown in Fig. 1. Plungers G G G G are then placed in position and drawn slowly and uniformly toward ring F by means of bolts $G'$ $G'$ $G'$ $G'$ through slots $F^2$ $F^2$ $F^2$ $F^2$ in ring F and bear on gland-ring E. As operated the plungers G G G G are forced forward by operating the bolts $G'$ $G'$ $G'$ $G'$ against gland-ring E, which compresses the packing against the face of the fitting B over the leak, stopping it effectually. The confining-ring B being of greater width than the packing C projects over it and leaves an opening into which gland-ring E is inserted. Ring E is of sufficient size to fit snugly over pipe A and under ring D and of ample width to allow the placing of set-screws *e e* after it has been driven far enough to stop the leak. When the set-screws *e e* are inserted in E, the action tends to lift the sections of E away from pipe A and bind them against D, holding them firmly and securely against ring D and preventing them from slipping out. When the leak is stopped, the ring F, plungers G G G G, and bolts $G'$ $G'$ $G'$ $G'$ are removed to be used again.

Having thus fully described our invention and the manner of using it, what we claim, and desire to secure by Letters Patent, is—

1. In an apparatus for stopping leaks between pipes and fittings the combination of a pipe, a fitting, a packing-ring, a gland-ring provided with set-screws, arranged to engage said pipe, with a two-part confining-ring, substantially as described.

2. In an apparatus for stopping leaks between pipes and fittings, the combination of a pipe, a fitting, a packing-ring, a gland provided with holding devices, a confining-ring comprising a plurality of separable sections having registering projections and recesses for interlocking said sections, with adjustable and removable compressing devices, substantially as described.

3. In an apparatus for stopping leaks between pipes and fittings, the combination with a confining-ring adapted to surround a pipe, said ring comprising a plurality of separable sections having registering projections and recesses for interlocking said sections, and a packing-ring adapted to be placed between said confining-ring and such pipe, of a gland-ring likewise arranged to fit between the confining-ring and the pipe, and adapted to be forced against and to compress said packing-ring, said gland-ring provided with holding devices adapted to engage the pipe and hold said gland in place.

4. In an apparatus for stopping leaks between pipes and fittings, the combination with a confining-ring adapted to surround a pipe, and a packing-ring adapted to be placed between said confining-ring and such pipe, of a gland-ring likewise arranged to fit between the confining-ring and the pipe, and adjustable removable compressing means for forcing the same against said packing-ring, said gland-ring provided with holding devices.

5. In an apparatus for stopping leaks between pipes and fittings, the combination with a confining-ring, and a gland, of a two-part detachable compression-ring provided with lugs and slots, plungers in said slots, and screws for pressing the same against said gland.

In testimony whereof we have signed our names to this specification, in the presence of two subscribing witnesses, this 31st day of May, 1902.

DAVID T. PITKETHLY.
JEROME C. HAYES.

Witnesses:
JOHN A. ENOS,
MARIAN S. RHODES.